Dec. 28, 1965 J. SHIRMAN 3,226,647
PULSE FREQUENCY MULTIPLIER USING DELAY LINE WITH PLURAL TAPS, EACH FED BY INDIVIDUAL DIODE FROM SOURCE
Filed Sept. 3, 1963
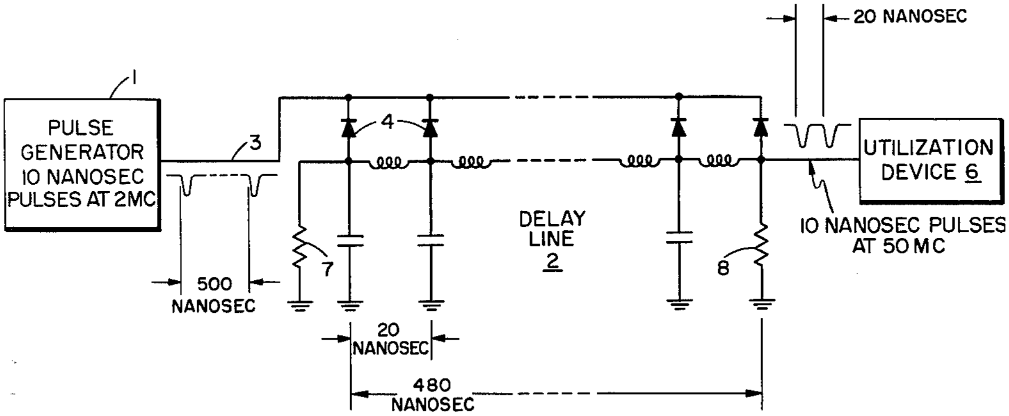
INVENTOR.
JACK SHIRMAN
BY Robert Nathans
ATTORNEY 3,226,647
Patented Dec. 28, 1965

3,226,647

PULSE FREQUENCY MULTIPLIER USING DELAY LINE WITH PLURAL TAPS, EACH FED BY INDIVIDUAL DIODE FROM SOURCE

Jack Shirman, Rochester, N.Y., assignor to General Dynamics Corporation, Rochester, N.Y., a corporation of Delaware Filed Sept. 3, 1963, Ser. No. 306,060
5 Claims. (Cl. 328—16)

The present invention relates to very high frequency pulse train generators.

In the field of electronic switching, it has become desirable to produce trains of pulses having pulse widths in the neighborhood of 10 nanoseconds and pulse repetition rates in the neighborhood of 50 megacycles. Known circuits for generating pulses having pulse widths of 10 nanoseconds are incapable of generating pulse trains having pulse repetition rates exceeding 3 to 5 megacycles.

Accordingly, it is the principal object of the present invention to provide a new and improved pulse train generator for generating very narrow pulses having extremely high pulse repetition rates.

It is a further object of the present invention to provide a new and improved pulse train generator for generating very narrow pulses at very high pulse repetition rates which do not utilize expensive high speed diodes or transistors.

Pulse train generator 1 is schematically disclosed in the figure, which generator produces 10 nanosecond pulses at 2 megacycles. Such a generator could comprise a common emitter inverter utilizing an N-P-N silicon transistor operated in the "avalanche mode," which inverter is driven by a 2-megacycle oscillator. The output circuit of pulse generator 1 is coupled to delay line 2 via conductor 3 and low speed diodes 4. Delay line 2 could be an ordinary lumped parameter type delay line having spaced points or taps, as shown in the figure. In the event that it is desired to apply 10 nanosecond pulses at 50 megacycles to utilization device 6, twenty-five taps would be provided, each of which is coupled to the output circuit of pulse generator 1 through low speed diodes 4. Assuming an uninterrupted train of pulses is to be supplied to utilization device 6, delay line 2 would have a total delay time of 480 nanoseconds. Consequently, delay line 2 would comprise twenty-four stages, each of which has a delay time of 20 nonoseconds which is equal to the period of the 50 MC pulse train. Resistors 7 and 8 are provided at the ends of delay line 2, which resistors terminate the line in its characteristic impedance thereby to prevent reflection of pulses within the line which would, of course, produce spurious signals in the output circuit of delay line 2. Should it be desirable to generate a pulse train having a pulse repetition rate of 20 megacycles, ten taps would be provided (10×2 mc.=20 mc.).

Diodes 4 are utilized to prevent pulses traveling down the delay line from being reintroduced into the line over conductor 3. Since these diodes need not be of the high speed variety, the cost of applicant's circuit is quite small.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. Circuitry for generating a very high frequency pulse train having a period of T nanoseconds comprising a relatively low frequency pulse train generator for generating pulses having pulse widths less than T nanoseconds and having an output circuit, a delay line having a plurality of spaced points, the time delay between said points being substantially equal to T nanoseconds, means coupled between the output circuit of said pulse train generator and said spaced points for introducing pulses produced by said low frequency pulse train generator into said delay line, means for preventing pulses moving within said delay line from re-entering said delay line via said last-named means, and a utilization device coupled to the output circuit of said delay line.

2. Circuitry for generating a very high frequency pulse train having a period of T nanoseconds comprising a relatively low frequency pulse train generator for generating pulses having pulse widths less than T nanoseconds and having an output circuit, a delay line having a plurality of spaced points, the time delay between said points being substantially equal to T nanoseconds, means coupled between the output circuit of said pulse train generator and said spaced points for simultaneously introducing pulses produced by said low frequency pulse train generator into said delay line, means for preventing pulses moving within said delay line from re-entering said delay line via said last-named means, means for preventing pulse reflections within said line, and a utilization device coupled to the output circuit of said delay line.

3. Circuitry for generating a very high frequency pulse train having a period of T nanoseconds comprising a relatively low frequency pulse train generator for generating pulses having pulse widths less than T nanoseconds and having an output circuit, a delay line having a plurality of spaced points, the time delay between said points being substantially equal to T nanoseconds, means coupled between the output circuit of said pulse train generator and said spaced points for simultaneously introducing pulses produced by said low frequency pulse train generator into said delay line, means for preventing pulses moving within said delay line from re-entering said delay line via said last-named means, and a utilization device coupled to the output circuit of said delay line.

4. Circuitry for generating a very high frequency pulse train having a period of T nanoseconds comprising a relatively low frequency pulse train generator for generating pulses having pulse widths less than T nanoseconds and having an output circuit, a delay line having an output circuit and a plurality of taps, the time delay between said taps being substantially equal to T nanoseconds, a unidirectional conductive element coupled between each of said taps and the output circuit of said low frequency pulse train generator, said unidirectional elements being poled so as to pass pulses generated by said low frequency generator simultaneously from said generator to said taps, and a utilization device coupled to the output circuit of said delay line.

5. Circuitry for generating a very high frequency pulse train having a period of T nanoseconds comprising a relatively low frequency pulse train generator for generating pulses having pulse widths less than T nanoseconds and having an output circuit, a delay line having an input circuit, an output circuit and a plurality of taps, the time delay between said taps being substantially equal to T nanoseconds, a unidirectional conductive element coupled between each of said taps and the output circuit of said low frequency pulse train generator, said unidirectional elements being poled so as to pass pulses generated by said low frequency generator simultaneously from said generator to said taps, means coupled to the input circuit of said delay line for preventing pulse reflections, and a utilization device coupled to the output circuit of said delay line.

References Cited by the Examiner

UNITED STATES PATENTS

| | | | |
|---|---|---|---|
| 2,539,465 | 1/1951 | Parker | 178—69.5 |
| 2,543,907 | 3/1951 | Gloess et al. | 333—29 |
| 2,589,254 | 3/1952 | Hoepner | 333—29 |
| 2,764,678 | 9/1956 | Craib | 328—58 |
| 2,912,601 | 11/1959 | Slatten | 328—58 |
| 3,001,137 | 9/1961 | Kassel et al. | 328—38 |
| 3,121,870 | 2/1964 | Mortley | 343—11 |

HERMAN KARL SAALBACH, *Primary Examiner.*